Patented June 2, 1953

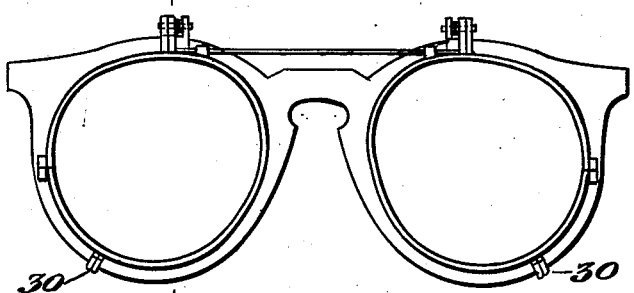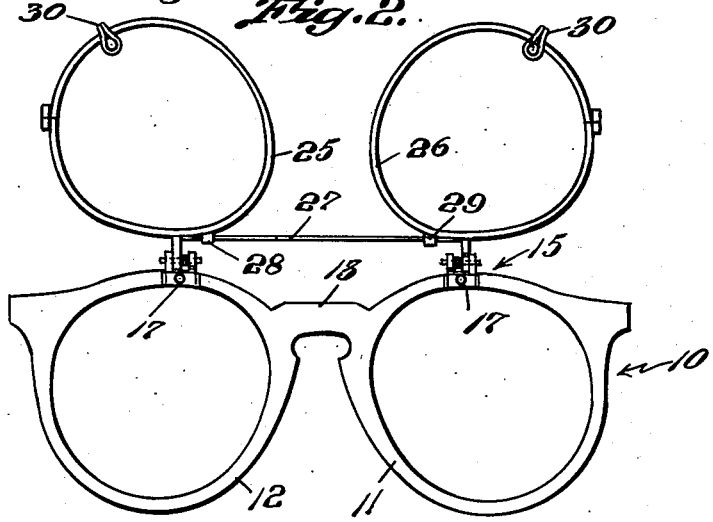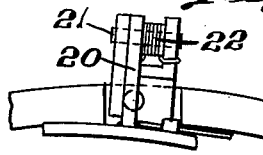

2,640,390

UNITED STATES PATENT OFFICE 2,640,390

OPHTHALMIC MOUNTING

William Smith Muncy, Providence, R. I.

Application July 29, 1952, Serial No. 301,429

5 Claims. (Cl. 88—41)

This invention relates to an ophthalmic mounting, more particularly to a spectacle frame having a supplemental frame mounted thereon.

It has been known heretofore that supplemental lenses may be mounted in such a way as to swing in front of a main spectacle frame for various purposes. Usually there is some complexity involved in the hinged relationship of the lenses or in the securing of the lenses in one or another position.

One of the objects of this invention is to provide a spectacle mounting in which a supplemental pair of lenses may be hinged in such a way that they will normally swing out of the line of vision but which may be latched into the line of vision as desired. Thus the supplemental mounting may serve either for the purposes of bifocal glasses, sun glasses, a guard for the main glasses, or for various other purposes.

Another object of this invention is to provide a main frame with a supplemental frame hinged thereto with the supplemental frame joined by a resilient bridge in such a way that the rocking of the supplemental lenses with reference to each other and to the main frame rims may serve to latch the supplemental rims in position or release them from position for permitting them to swing out of the range of vision.

Another object of this invention is to provide a relatively simple and inexpensive construction and one which may be conveniently carried about or worn by the user.

With these and other objects in view, the invention consists of certain novel features of construction as will be more fully described and particularly pointed out in the appended claims.

In the accompanying drawings:

Figure 1 is a front view of a spectacle frame equipped with my invention;

Figure 2 is a view similar to Figure 1 but showing the supplemental frame as swung to raised position;

Figure 3 is a sectional view on substantially line 3—3 of Figure 1;

Figure 4 is a fragmental view of the hinge member with the parts in raised position as shown in Figure 2; and Figure 5 is a view similar to Figure 4 but showing the parts in operating position as shown in Figure 1.

In proceeding with this invention, I have provided a relatively rigid main frame of a spectacle, and I have hinged to each of the rims a supplemental rim in such a way that it may swing into substantial registry with the main rim. The member which provides this pivotal relation may itself rock in the plane of the main rim, while a spring or resilient bar connects the two supplemental rims to make a supplemental frame which permits this rocking relation of the members to occur while the supplemental rims are hingedly mounted. Hook-like arms are provided on each of the supplemental rims to hook over the main rim when the rims are in overlapping relation, the spring bar serving to permit sufficient rocking of each supplemental rim to release its arm, while springs at the hinged mountings will swing the auxiliary rims upwardly out of the line of vision through the lenses of the main rim.

With reference to the drawings, the main frame is designated generally 10 and as shown more clearly in Figure 2 comprises rims 11 and 12 of a relatively rigid non-metallic material such as zylonite or the like. A bridge 13 connects these rims and may be formed of the same material and of one piece with the rims 11 and 12.

Each of the rims 11 and 12 is provided with a notch or recess in its front and rear surface, which is shown more particularly in Figure 4 at 14, which recess receives a member 15 having a pair of plate-like parts 16 straddling the rim 12 and pivoted to the rim by a pivot pin 17 so that this member as a whole may rock about the axis of the pin 17 which extends at right angles to the plane of the rims 11 and 12. Thus, this rocking may occur in substantially the plane of these rims. The member 15 has a pair of lugs 18 and 19 extending upwardly therefrom between which there is located an arm 20 which is pivotally mounted on the pin 21 extending through the arm and lugs. A spring 22 encircles the pin 21 with one end portion 23 engaging the lug 19, while the other end portion 24 engages the arm 20 to swing the same upwardly.

Each arm 20 is rigidly secured to a supplemental rim 26 which is substantially the size and shape of the rims 11 and 12 and may be swung into substantial registry with the rim 11 and 12 against the tension of the spring 22. A resilient bridge 27 is secured to rims 25 and 26 as at 28 and 29 but may flex as the member 15 swings on their pivots.

Arms 30 which are of hook shape are secured to each of the supplemental rims 25 and 26 at a point substantially diametrically opposite the rim from the connection of the resilient bar such as at 28. With this structure the supplemental frame comprising the rims 25 and 26 and resilient bridge 27 may be swung about the pivots 21 into substantial registry with the rims 11 and 12 and then by flexing the resilient bridge 27 to swing the rims 25 and 26 outwardly, the arms 30 may be hooked over the rims 11 and 12, and then, upon releasing, the bridge 27 will swing the arms 30 toward each other into hooking relation with the rims 11 and 12, and the spring 22 which is under tension when the supplemental rim is swung into its lower operating position will be prevented from lifting the supplemental frame from the position shown in Figure 1 to the position shown in Figure 2. However, when it is desired to no longer use the supplemental lenses contained in the rims 25 and 26 but to alone use the lenses in the rims 11 and 12, swinging of the rims 25 and 26 outwardly about the pivots 17 will serve to release the arms 30 from their hook engagement with the rims 11 and 12 and then upon release, the rims of the supplemental frame will assume their normal position and will swing upwardly out of the range of vision and into the position shown in Figure 2. By this arrangement the latching of the supplemental frame in operating position is simple and yet effective for holding the parts as desired.

I claim:

1. In an ophthalmic mounting, a main frame comprising a pair of rims, a bridge connecting said rims, a supplemental frame comprising a pair of rims, a member pivoted to each rim of the main frame on a pivot at right angles to the plane of the rims to rock about the pivot in generally the plane of the rim, said members each hingedly mounting a rim of the supplemental frame to swing about an axis parallel to the plane of the main rim, arms with hook ends on the rims of the supplemental frame extending over the rims of the main frame and a resilient bridge connecting the rims of the supplemental frame urging the arms to engage the main rims but flexing to permit the arms to be disengaged by swinging said members on their pivots to permit swinging of the supplemental frame about its hinge connection to the main frame.

2. In an ophthalmic mounting as in claim 1 wherein a spring at said hinge mounting swings said supplemental frame away from the main frame when the hook arms are released.

3. In an ophthalmic mounting as in claim 1 wherein said main frame bridge is rigid with said main rims.

4. In an ophthalmic mounting as in claim 1 wherein the resilient bridge is connected to the supplemental rim adjacent its mounting on said member.

5. In an ophthalmic mounting as in claim 1 wherein the resilient bridge is connected to the supplemental rim adjacent its mounting on said member and each of said arms is connected to said supplemental rim at a point substantially diametrically opposite the location of the resilient bridge connection to the supplemental rim.

WILLIAM SMITH MUNCY.

References Cited in the file of this patent

UNITED STATES PATENTS

| Number | Name | Date |
|---|---|---|
| 1,195,326 | Arnold | Aug. 22, 1916 |
| 2,282,637 | Bouchard | May 12, 1942 |
| 2,492,072 | Tapner | Dec. 20, 1949 |